United States Patent
Eling et al.

(10) Patent No.: US 12,252,252 B2
(45) Date of Patent: Mar. 18, 2025

(54) DIRECTIONAL ARRAY INTERCOM FOR INTERNAL COMMUNICATION ON AIRCRAFT

(71) Applicant: Gulfstream Aerospace Corporation, Savannah, GA (US)

(72) Inventors: Stefan Eling, Savannah, GA (US);
Justin Maas, Savannah, GA (US);
Bethany Davis, Savannah, GA (US);
Scott Bohanan, Savannah, GA (US);
Jim Jordan, Savannah, GA (US);
Tongan Wang, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 286 days.

(21) Appl. No.: 17/502,783

(22) Filed: Oct. 15, 2021

(65) Prior Publication Data
US 2023/0122420 A1 Apr. 20, 2023

(51) Int. Cl.
*B64D 11/00* (2006.01)
*G10L 15/08* (2006.01)
(Continued)

(52) U.S. Cl.
CPC .......... *B64D 11/0015* (2013.01); *G10L 15/08* (2013.01); *G10L 15/26* (2013.01);
(Continued)

(58) Field of Classification Search
CPC ..... B64D 11/0015; G10L 15/08; G10L 15/26; H04R 1/403; H04R 1/406; H04R 2499/13;
(Continued)

(56) References Cited

U.S. PATENT DOCUMENTS

| 6,909,921 B1 * | 6/2005 | Bilger | G08B 21/0492 |
| | | | 700/63 |
| 2007/0185718 A1 * | 8/2007 | Di Mambro | G07C 9/37 |
| | | | 704/270.1 |

(Continued)

FOREIGN PATENT DOCUMENTS

| EP | 3833045 A1 | 6/2021 |
| EP | 4009664 A1 | 6/2022 |

(Continued)

*Primary Examiner* — Daniel C Washburn
*Assistant Examiner* — Paul J. Mueller
(74) *Attorney, Agent, or Firm* — Lorenz & Kopf, LLP

(57) ABSTRACT

The aircraft intercom employs beam steerable microphone arrays and speaker arrays deployed in each of a plurality of zones within the aircraft. A speech recognizer generates recognition text from utterances picked up by the microphone arrays. A direction control processor analyzes the arrival time of signals from the microphone arrays to identify utterance location, which is then used to control the beam direction of at least one steerable speaker array. A dialogue manager processor coupled to the speech recognizer and to each of the plurality of microphone arrays and plurality of speaker arrays responds to a set of predefined keywords to selectively route a voiced communication from a first selected zone to a second selected zone using the microphone array and speaker array disposed in each of the first and second selected zones.

20 Claims, 6 Drawing Sheets

(51) Int. Cl.
*G10L 15/26* (2006.01)
*H04R 1/40* (2006.01)

(52) U.S. Cl.
CPC ............ *H04R 1/403* (2013.01); *H04R 1/406* (2013.01); *H04R 2499/13* (2013.01)

(58) Field of Classification Search
CPC .. H04R 3/12; H04R 2203/12; H04R 2430/20; H04R 2430/23; H04R 3/005; G10K 11/346; H04S 7/303
See application file for complete search history.

(56) References Cited

U.S. PATENT DOCUMENTS

| | | | |
|---|---|---|---|
| 2008/0164377 A1* | 7/2008 | Lautridou | B64C 1/1469 |
| | | | 244/118.5 |
| 2016/0100265 A1* | 4/2016 | Maggiore | G06F 16/9535 |
| | | | 381/56 |
| 2018/0146285 A1 | 5/2018 | Benattar et al. | |
| 2018/0234707 A1 | 8/2018 | Pujia et al. | |
| 2018/0288104 A1* | 10/2018 | Padilla | H04L 65/1069 |
| 2019/0281387 A1* | 9/2019 | Woo | H04R 5/04 |
| 2019/0394338 A1* | 12/2019 | Wada | H04M 9/082 |
| 2020/0304916 A1* | 9/2020 | Asfaw | H04S 7/303 |
| 2020/0374624 A1* | 11/2020 | Koschak | G10K 11/178 |
| 2021/0370836 A1* | 12/2021 | Xu | H04R 1/406 |
| 2022/0006813 A1* | 1/2022 | Jorasch | G07C 9/37 |

FOREIGN PATENT DOCUMENTS

| | | |
|---|---|---|
| WO | 2006130329 A2 | 12/2006 |
| WO | 2020150022 A1 | 7/2020 |

* cited by examiner

DIRECTIONAL ARRAY INTERCOM FOR INTERNAL COMMUNICATION ON AIRCRAFT

TECHNICAL FIELD

The disclosure relates generally to audio intercom systems for aircraft. More particularly the intercom system uses distributed, acoustically steerable beam speaker and microphone arrays to track the location of a user's voice, and uses keyword speech recognition and dialogue processor to route communications between different zones within the aircraft.

BACKGROUND

This section provides background information related to the present disclosure which is not necessarily prior art.

Before and during flight, flight attendants and crew within the cabin and pilots on the flight deck need reliable means of communication with each other. While passengers may be included in general announcements, there are many instances in which pilots and crew need to communicate, without disturbing the passengers. In some instances, a pilot may need to communicate with crew who are on duty, without waking off-duty crew members who are sleeping.

Conventionally, crew-pilot communication is carried by a dedicated intercom system connecting the pilots' headsets with crew headsets or handsets (e.g., plugged into jacks) distributed at dedicated locations throughout the cabin, typically adjacent the flight deck, close to crew seat and in the aft lavatory area.

Such headsets and handsets are not always convenient, and in some instances quite cumbersome to use. For example, in emergency situations involving smoke, fire or fumes, the flight crew must wear personal protection equipment (PPE) while performing their duties in suppressing fire or removing smoke and fumes. This PPE is designed to protect the face and body of the responding crew member. The PPE face shield, and the presence of fire, smoke or fumes can make it difficult to find and use the headset, particularly in confined regions within the aft lavatory.

SUMMARY

The disclosed intercom system provides a handsfree pilot-crew intercom system that addresses the shortcomings of the conventional distributed headset system. Instead of relying on wired headsets or handsets, the disclosed system uses plurality of directional microphone array and directional speaker array systems, deployed at suitable locations or zones within the cabin and flight deck. The microphone arrays and speaker arrays form part of an intercom system that controls or steers the beam pattern pointing directions of each the respective microphone arrays and speaker arrays. The pointing direction (listening direction) of the microphone array beam pattern is produced by introducing timing delay or phase shift differences among the individual microphone transducers comprising one microphone array. Similarly, the pointing direction of the speaker array beam pattern is produced by introducing timing delay or phase shift differences among the individual speaker transducers comprising one speaker array.

By invoking the system through use of a keyword or phrase, the system determines the location of the pilot or crew member from which the keyword utterance originated and then adjusts the pointing direction or focus of a nearby microphone array to focus pick up of further utterances from that person.

The system then adjusts the pointing direction of a speaker array within the zone in which the person is located, to focus or project acoustic notifications and communications from the intercom system to the person within that zone, so that the message can be heard more clearly by that person.

Multiple different two-way or n-way communications can be managed at once, thanks to a message routing system that maintains a data record of each two-way, n-way and broadcast communication in progress. The data record stores the locations of each dialog origination and endpoints, so that all notifications and communication messages are routed to the nearest or best performing microphone array and speaker array, for each party to the communication.

While a communication is in progress, the message routing system compares the signals received by a currently in-use microphone array with time-correlated signals received from other nearby microphone arrays and will automatically hand off the communication to a better performing microphone array if the speaking person is moving out of range of the currently in-use microphone array. In this way, if a crew member is moving about the cabin while conducting a dialog, the location of that crew member is reassessed by analyzing the microphone array data and a better performing microphone array can be selected for subsequent use.

If, any time, a person cannot hear clearly from the currently in-use speaker array, that person can simply utter a calibration message, such as "GINA, calibrate," and this utterance will be used to determine that person's current location and refocus the speaker array beam. In the illustrated embodiment, the term GINA (for Gulfstream Internal Notification Array) has been used throughout. It will be understood that a different word or phrase may be used.

Therefore, in accordance with one aspect of the disclosure, an intercom for an aircraft having a flight deck and cabin which define a plurality of spatially disparate zones is provided. The intercom employs a plurality of microphone arrays, disposed in each of the plurality of zones; and a plurality of speaker arrays, disposed in each of the plurality of zones. The plurality of steerable speaker arrays each produce an individually controllable steerable acoustic beam.

The intercom includes a speech recognizer that is coupled to each of the plurality of microphone arrays and operable to generate recognition text corresponding to utterances derived from acoustic signals picked up by the plurality of microphone arrays. A direction control processor is coupled to each of the plurality of microphone arrays and to each of the plurality of speaker arrays. The direction control processor is programmed to analyze arrival time of signals from at least one of the plurality of steerable microphone arrays to identify a location of an utterance and to use the identified location to control a beam direction of at least one of the plurality of steerable speaker arrays.

The intercom further includes a dialogue manager processor coupled to the speech recognizer and to each of the plurality of microphone arrays and plurality of speaker arrays. The dialogue manager processor being programmed to respond to a set of predefined keywords to selectively route a voiced communication from a first selected zone to a second selected zone using the microphone array and speaker array disposed in each of the first and second selected zones.

BRIEF DESCRIPTION OF THE DRAWINGS

The drawings described herein are for illustrative purposes only of selected embodiments and not all possible implementations. The particular choice of drawings is not intended to limit the scope of the present disclosure.

DETAILED DESCRIPTION

Introduction and Basic Functionality

The intercom system uses onboard microphone and speaker arrays to enable internal communications between different areas or zones on aircraft. Using meta-command keywords like "GINA", the flight crew or passenger can request communication to other areas of the aircraft. For example, "GINA, flight deck," spoken by a person within the cabin will prompt connection to the flight deck. In implementing a system, any meta-command keyword can be used. Thus, it will be understood that the keyword "GINA" is merely an example.

For privacy purposes, the connection request must be accepted before two-way communication is established. For example, the recipient will hear a broadcast message like "A GINA communication request from cabin is pending approval." A response such as "GINA, accept" will establish communication to the cabin.

For privacy purposes, a two-way communication can be closed at any time using key words "GINA, stop" from either area involved in the communication. For privacy purposes, all GINA communications remain onboard aircraft and are not recorded.

While routine use of the disclosed intercom system will normally be used to support communications between pilot and crew, or among crew members, the system can also be used to enable passengers to talk to the flight crew without the need to walk to the flight deck or crew rest area.

The disclosed intercom system is particularly useful when troubleshooting problems outside the flight deck. The flight crew can troubleshoot the problematic site while maintaining communication with the flight deck. During emergency situations, such as those involving smoke, fire or fumes, the flight crew can communicate with the flight deck without the need to look for and wear a headset.

The disclosed intercom system may be implemented using one or more processors, such as microprocessors, microcontrollers, digital signal processors (DSP), field programmable gate array (FPGA) devices and combinations thereof. These processors are programmed to perform the functionality as explained and described below.

Overview of Intercom System Components

Figure 1:
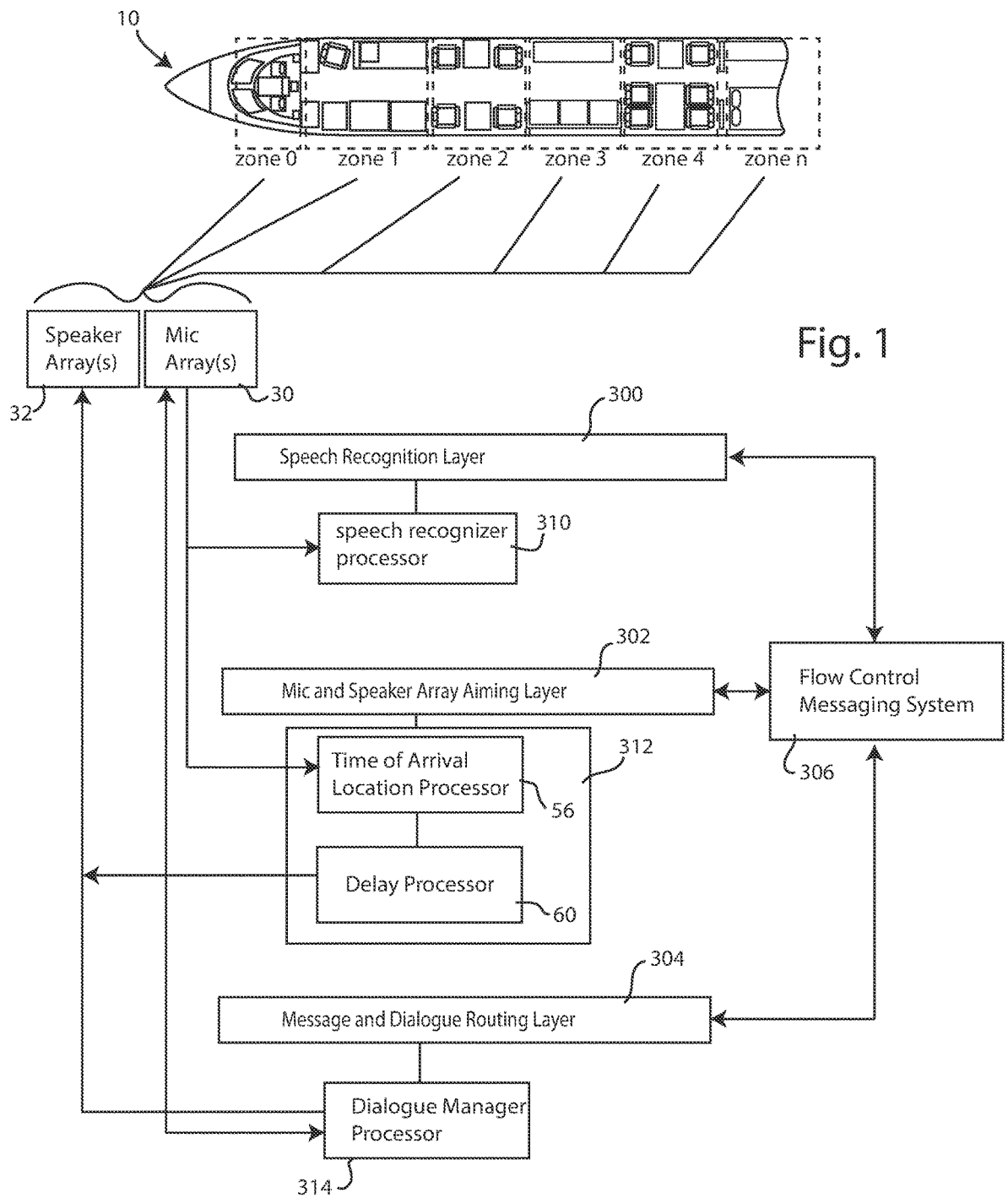
FIG. 1 is a block diagram of the intercom system.

As shown in FIG. 1, the disclosed intercom system is designed to be deployed within the aircraft 10 and employs a plurality of microphone arrays 30 and speaker arrays 32 distributed in predetermined areas or zones throughout the aircraft. As illustrated these zones represent uniquely addressable areas within the aircraft. In the illustrated example, the flight deck lies within zone 0, and the passenger and crew cabin areas lie within zones 1 . . . zone n. The disclosed intercom system processes and routes speech messages and dialogues between addressable zones throughout the aircraft using the processing system illustrated.

As will be further explained, the microphone arrays are positioned to pick up utterances (e.g., human speech) from the passengers, pilots and other crew. Signal processing circuitry analyzes these received utterances to determine the position at which the utterance originated. This information is then used by a beam steering system to electronically steer the beam of a nearby speaker array. The same information is also used to steer the beamforming microphone array to enhance speech intelligibility of that person in a noisy environment. Thus the system is able to supply audio content directly to the location of each occupant.

Specifically, the disclosed intercom system processes speech messages and dialogs using processors assigned to three different control layers, namely a speech recognition layer 300, a microphone and speaker array aiming layer 302 and a speech recognition and message and dialog routing layer 304. These layers are cooperatively interconnected by the system processor's operating system 306, which includes a flow control messaging system by which conditions in one layer are communicated to the other layers. These control layers are processor-implemented as will now be described.

The speech recognition layer 300 employs a speech recognition processor 310, such as a trained neural network or Hidden Markov Model-based processor, that listens to all acoustic signals picked up by the microphone arrays throughout the aircraft, processing those signals to detect if any one of the signals correlates to predefined meta-command keywords beginning with an attention keyword. In this disclosure "GINA" is used as the attention keyword. Any suitable keyword (not commonly used in daily speech) will suffice.

When a meta-command keyword utterance is detected with sufficiently high recognition likelihood, a control message is sent by the speech recognizer processor 310 via the operating system 306 flow control messaging system to the array aiming layer 302 and the dialog routing layer 304, causing both of these layers to wake up and begin active processing.

The microphone and speaker array aiming layer 302 employs a direction control processor 312 which performs a collection of tasks related to determining location of a person speaking and steering the microphone and speaker arrays 30 and 32, respectively, to optimize communication with that person. Among the functions performed by processor 312 is making the initial assessment which microphone array and speaker array to use. Specifically, the direction control processor 312 identifies one of the microphone arrays as a primary microphone array based on having the strongest microphone signal. Signal levels of the other microphone arrays are also monitored by processor 312 and compared with the signal level from the primary microphone array. Such comparisons are used to detect if the person speaking has moved to a different area or zone during the dialog.

Using the primary microphone array, the direction control processor 312 performs time of arrival analysis on the acoustic signals received by the primary microphone array and uses this information to determine the location from which utterances of a speaking person originate. This includes determining the location from which the meta-command originated as well as subsequent utterances. In one embodiment these time of arrival analyses are performed by a time of arrival location processor 56, discussed more fully below.

The direction control processor 312 uses the determined speaking person's location information to direct, steer or focus the acoustic beam of the primary speaker array 32 towards the speaking person's location. In one embodiment, beam steering is performed using a delay processor 60, which injects specifically calculated time delays or phase shifts into each of the electrical signals supplied to each of the individual speakers comprising the primary speaker array 32. The functioning of the delay processor 60 is discussed more fully below.

Dialogue Manager

The disclosed intercom system, in the message and dialog routing layer 304, includes a dialogue manager processor 314, which is programmed to route messages between different areas or zones, based on the state of what keyword meta-commands were previously uttered and recognized by the speech recognizer processor 310.

For example, if a microphone array located on the flight deck picks up an utterance from a pilot, "GINA galley," the speech recognizer 310 would recognize the utterance as belonging to a predefined set of meta commands and would pass the recognized text of the utterance (or a suitable parameter corresponding to the recognized text) through the flow control messaging system 306 to the message routing and dialog layer 304. The dialog manager processor 314 would then parse and act upon the text command or parameter by opening an intercom channel between the flight deck and the galley (i.e., between the speaker arrays and microphone arrays of the flight deck and galley respectively). The dialog manager processor 314 would then issue a synthesized or digitally prerecorded voice message to the galley speaker array announcing, "A GINA communication from the flight deck is pending approval." The dialog manager processor 314 then monitors the opened channel for a predetermined response time, during which a crew member would either respond by uttering, "GINA, accept," or the response time would lapse. Upon response time lapse, the dialog manager processor 314 issues a synthesized voice message to the flight deck, "no response from galley."

The dialog manager processor functions primarily to open and close communication channels between a first area or zone within the aircraft and a second area or zone within the aircraft. Channels can be opened for person-to-person communication between two zones; or opened for multicast or broadcast across more than two zones.

Once the channel is open and in use between two or more parties, the dialog manager processor 314 retreats to a non-interfering mode where communications are allowed to proceed without interaction with the dialog manager. The dialog manager processor will intercede in a dialogue in progress only if certain supervisory metacommands are uttered, such as, "GINA, Stop," which causes the processor 314 to close the communication channel.

During a dialogue, a crew member may move around within the area or zone such that the primary speaker array is no longer optimally pointed in the crew member's direction. The dialog manager processor 314 is programmed to handle such situation in response to a meta-command, "GINA, calibrate." When such a recalibration request is recognized by the speech recognizer 310 and passed to the dialogue manager processor 314, the processor 314 issues an command through the flow control messaging system 306 to the mic and speaker array aiming layer 302. The time of arrival location processor 56 uses the acoustic data associated with the "GINA, calibrate" utterance to recalibrate the speaker's location. The newly determined speaker location is then used by the delay processor 60 to steer the speaker array beam to the new location.

The recalibration procedure outlined above highlights an important aspect of the disclosed intercom system—acoustic data, recognized meta-data commands and flow control messaging instructions are correlated to a given event, even though these different data do not occur or change state at the same instant. This behavior is made possible because the acoustic data, picked up by the microphone array transducers, is stored in a timestamped buffer allowing the time of arrival location processor to look back in time to analyze a snippet of acoustic data corresponding to the "GINA, calibrate" utterance, even though the instruction to do so from the dialog manager processor was issued after the utterance transpired. The timestamp is configured to have the required resolution and accuracy to be used in such time calculations.

Routing Command Set

By way of example, the table below provides an exemplary list of speech recognized routing commands implemented by the dialogue manager processor 314. These commands are triggered by uttering the meta-command keyword GINA. It will be recognized that this table of commands is provided to illustrate the utility of the disclosed intercom system and is not intended as an exhaustive list. It will also be recognized that the meta-command keyword GINA is merely exemplary, as any keyword or phrase not normally uttered may be used.

| Command Format | Example | Description |
|---|---|---|
| GINA {location} | GINA, flight deck | specifies the area or zone being called |
| GINA {access control} | GINA, accept | conveys called party's acceptance of the call |
| GINA {access control] {automatic timeout termination} | GINA, stop | instruction to close channel |
| | channel is closed if no speech utterances detected for predetermine time | instruction to close channel after predetermined time of no use |
| GINA {broadcast} | GINA broadcast | opens channel to all areas and zones |
| GINA {calibrate} | GINA calibrate | causes location of speaker to be reassessed by time of arrival triangulation |

In addition to responding to voiced commands, the dialogue manager processor 314 may provide routing and control functions triggered by other means. Thus, the processor 314 may be configured to programmatically respond to sensed conditions on board the aircraft, flight deck device settings, or stage of flight within flight plan. For example, if turbulent conditions are sensed, the dialogue manager processor can cause an advisory message to be broadcast to all areas or zones. Certain types of messages to the crew sleeping quarters can be suppressed or blocked when an occupancy sensor indicates that those quarters are being occupied. The crew sleeping quarters message block can be automatically unblocked when the aircraft is in a predetermined stage of flight, such as during landing, or if the pilot purposefully overrides the block using spoken command or actuator manipulation from within the flight deck. Such override might be performed, for example, when the sleeping crew needs to be alerted to an emergency condition.

The dialogue manager may be coupled to a computer system onboard the aircraft that stores a record of a current flight plan and determines the aircraft state of flight relative to the current flight plan, such that the applied rules inhibiting routing to the sleeping zone take into account the aircraft state of flight.

Handoff to Another Zone

If a dialogue is in progress with a crew member who is moving from one area or zone to another, the direction control processor 312 will sense this because the signal strength of the primary microphone array will gradually decrease as the signal strength of the new area or zone will gradually increase. When the signal strengths from the two zones becomes approximately equal, the dialogue manager processor 314 is notified via the flow control messaging system 306, causing it to issue a voice prompt to the moving crew member requesting a recalibration. In response, the crew member would simply utter, "GINA calibrate" and the speaker's new location is acquired by time of arrival triangulation.

In practice, it may not be necessary for the crew member to be prompted to recalibrate because the crew member would likely detect that the speaker array beam from the original area or zone is no longer providing a robust signal. Thus, the recalibration sequence would be autonomous, and would operate without being prompted.

Dialogue Record Log

To handle zone transfers dialogue manager processor 314 maintains a record of each dialogue from the time of its inception until termination either by an explicit "GINA stop" message or by automatic timeout. Each such record comprises an indication of zone of origination, zone of destination and a timestamp when the dialogue was commenced. For example, the following record would indicate that a call was initiated from the flight deck (zone 0) to the galley (zone 1) at UTC timestamp 2021-08-23 20:02:51.

0, 1, 2021-08-23 20:02:51

When the call is terminated, its data record may be suitably marked as illustrated below, or simply erased.

0, 1, 2021-08-23 20:02:51 X—where X indicates an explicit STOP command or 0, 1, 2021-08-23 20:02:51 t/o—where t/o indicates call terminated by automatic timeout (There could also be a timestamp associated with X or t/o, providing duration of communication if useful.)

If a handoff occurs whereby the crew member moves from the galley to the forward passenger area (zone 3), the call record is updated by terminating the initial record and immediately writing an updated record as follows:

0, 1, 2021-08-23 20:02:51 X
  0, 3, 2021-08-23 20:04:14

By comparing the timestamps in the handoff example, note that the call handoff to zone 3 occurred 1 minute and 23 seconds after the call was initially established between zone 0 and zone 1.

The effect of this handoff is to close the channel to the speaker array in zone 1, while simultaneously opening a channel to the speaker array in zone 3. Similarly, after the handoff the microphone array in zone 3 will be used to pick up utterances from the roving crew member.

It will be appreciated that the data record examples are merely intended to show how a record of dialog threads may be documented and stored by the dialog manager processor 314. These records are useful during an ongoing dialog between two parties as they identify the endpoints of both sides of the communication and thus dictate how communications are routed. These records may also be saved in a log file for examination later, in the event communications to certain zones may be malfunctioning. For privacy reasons, these records do not contain any indication of the content of a particular dialogue or even what individuals were speaking. These records merely reflect that a communication channel was open between two zones during a certain timeframe.

Placement and Operation of Microphone and Speaker Arrays

Figure 2:
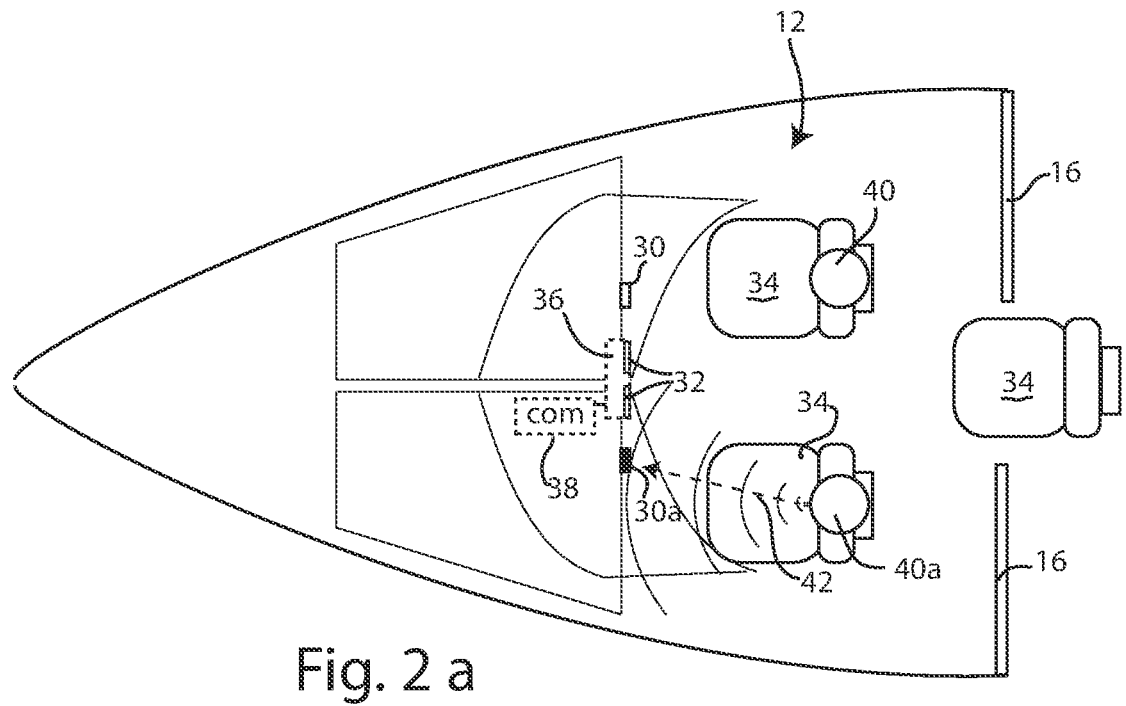
FIGS. 2a and 2b diagrammatically illustrate the sequence by which a pilot utterance is detected and used to steer the speaker array in the direction of that pilot.
Figure 2:
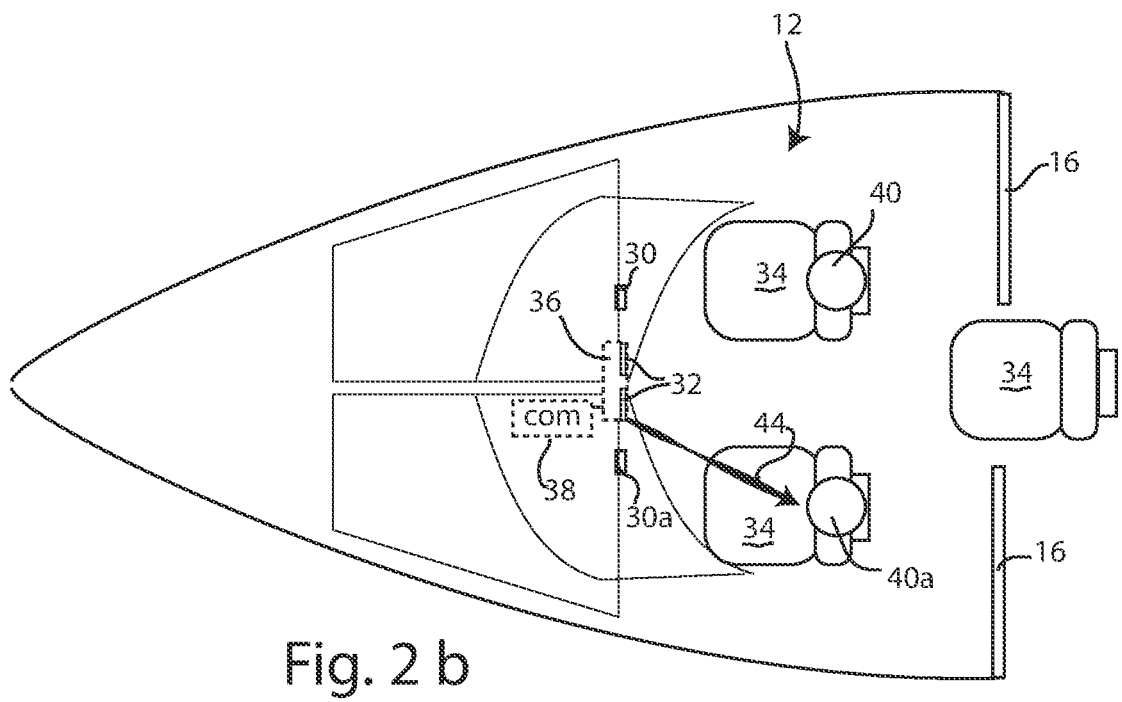

Referring to FIGS. 2a and 2b, the flight deck 12 is separated from the passenger quarters by bulkhead 16. In the illustrated example, three pilot seats 34 are provided, for pilot, copilot and an auxiliary pilot. Mounted in a suitable location on the instrument panel is a microphone array 30 (illustrated are two such arrays, one for pilot and one for copilot). In the general case one or more arrays will be deployed to handle communications from both pilots, with the goal of providing good directivity to allow simultaneous conversations by pilot and copilot to separate receivers. The number of microphone arrays needed to achieve this goal will depend on flight deck acoustics. Also suitably mounted is a speaker array 32 (illustrated are two such arrays, one for pilot and one for copilot). The electronic package for implementing the audio directing system 36 is shown diagrammatically in FIG. 4. Also illustrated diagrammatically at 38 is the avionics communication system that provides radio communication between the pilots and air traffic control and other services, including intercom communication with crew, and also provides audible warning and alert messages. This avionics communication system supplies audio content through the speaker arrays 32 positioned in front of the pilots.

FIGS. 2a and 2b illustrate how the audio directing system functions. As shown in FIG. 2a, the pilot 40a utters a spoken message which propagates as utterance 42 where it is received by microphone array 30a. The electronic audio directing system 36 processes the received utterance to determine the direction from which the utterance originated, and then uses that originating direction to electronically steer the acoustic output of speaker array 32 (located nearest pilot 40a) in the direction of pilot 40a. As illustrated in FIG. 2b, having now been steered to direct its acoustic energy at the pilot, the speaker array 32 transmits subsequent audio content from the avionics communication system 38 as a beam 44 of acoustical energy to that pilot. The audio directing system 38 may be configured to perform a sample and hold function whereby, having learned the location of a person from his or her utterance, the system will maintain the speaker array 32 trained on the learned location, unless a subsequent utterance dictates that the beam direction should be adjusted.

Beam Steering

Figure 3:
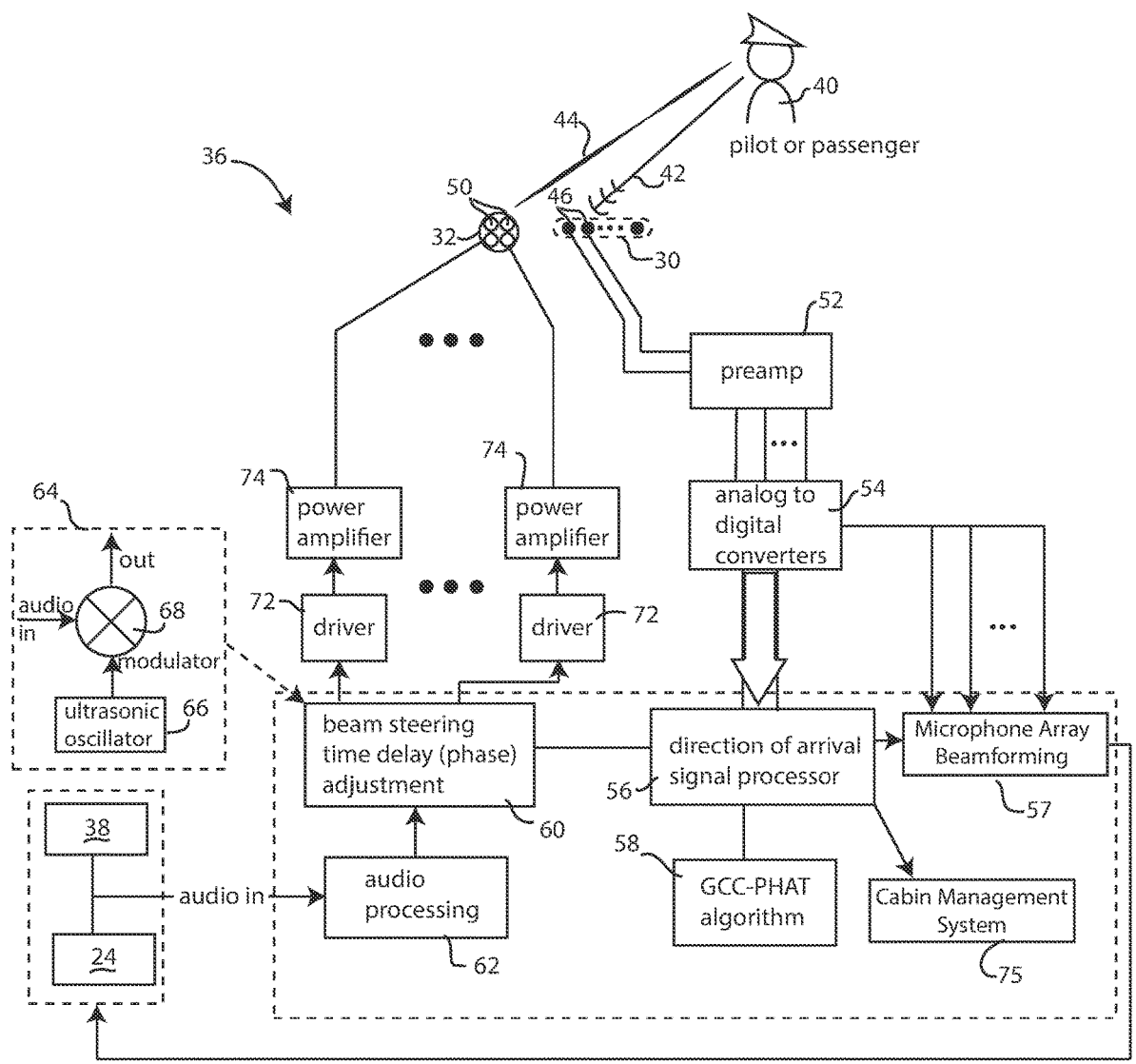
FIG. 3 is a block diagram illustrating how a microphone array and speaker array system may be combined with signal processing to steer the beamforming speaker array or beamforming microphone array pointing direction based on detected utterance.

Referring to FIG. 3, the audio directing system 36 is shown in greater detail. In a steered speaker mode, the system is designed to direct audio content from speaker array 32 to an occupant of the aircraft or beamform the microphone array toward the occupant, such as pilot or passenger 40, after sensing the occupant's direction or position by determining the originating direction of an utterance 42 spoken by the occupant. In a focused microphone mode, the system is also designed to focus a beamforming microphone array 30 (comprising plural microphone transducers 46) in the direction of the occupant after sensing the occupant's direction or position. The steered speaker and focused microphone applications may be utilized together if desired.

As previously discussed, the utterance 42 is picked up by a microphone array 30 comprising a plurality of individually addressable (independently monitored) microphone transducers 46 arranged in a predetermined grouping of known location and spacing. The speaker array 32 also comprises a plurality of individually addressable speaker transducers 50 of known location and spacing.

The individual microphone transducers 46 are each coupled to a multichannel preamplifier 52, which amplifies the respective outputs of each microphone 46 transducer to a suitable level to drive the multichannel analog to digital (A to D) converters 54. Because the audio directing system relies on time of arrival detection, the preamplifier 52 and analog to digital converter circuit 54 should be configured to introduce equal phase delay (or time delay), if any, on all channels. This will ensure that the relative time of arrival measurements are accurately determined, to ensure that the calculated time differences are accurate. This can be accomplished, in part, by careful component selection to match the impedance of the microphone transducers, and to minimize capacitive or inductive differences among channels, and by ensuring that electrical signal path lengths are the same for all channels. It is also possible to implement the system using microphone transducers that have a digital output, which do not require an analog to digital converters.

The multichannel A to D convertors 54 supply digital representations of each microphone transducer output to the signal processor 56, which uses a direction-of-arrival algorithm to determine the position or location of the utterance origin. The signal processor 56 is programmed to correlate and compare the sounds received by the transducers of the microphone array 30 to determine the time for the same utterance to arrive at each transducer. From these determined times, a time difference dt is calculated.

Utterance Location Using Time of Arrival

Figure 4:
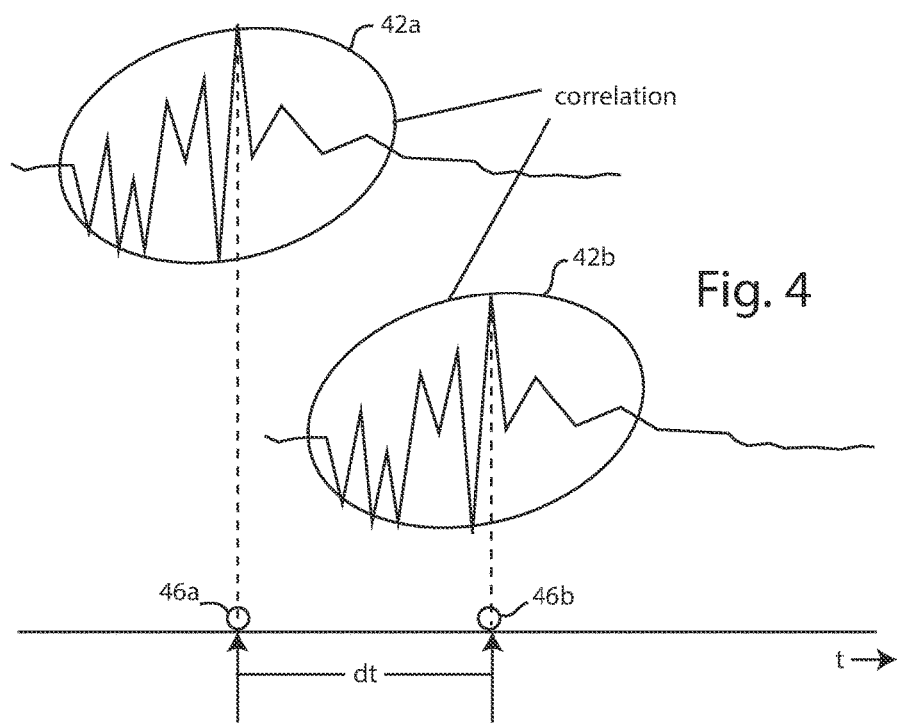
FIG. 4 is a waveform diagram illustrating how different time of arrival of the same uttered signal can be measured.

As illustrated diagrammatically in FIG. 4 utterance 42a arrives at a first transducer 46a before utterance 42b arrives at transducer 46b. The signal processor performs correlation on the sounds received by each transducer, in order to identify that utterances 42a and 42b represent the same utterance event, simply received at different times. By subtracting the arrival times of the respective received utterance signals, the time difference dt is computed by the processor. The position or location of the utterance origin is then calculated from this calculated time difference dt.

Figure 5:
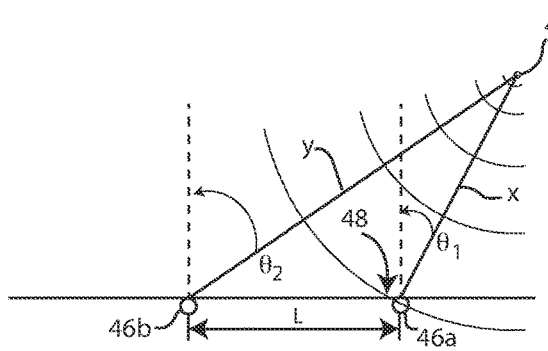
FIG. 5 is a diagram illustrating how the geometric origin of the wavefront of the uttered sound may arrive at the pair of microphone transducers from different apparent angles.

FIG. 5 illustrates how the computed difference dt in arrival times at the transducers 42a and 42b may be used to determine not only general direction from which the utterance came, but also, through triangulation, the precise position or location of the origin of the utterance 42. In FIG. 5, the utterance originates at 42 and acoustically propagates in a spherical wavefront, depicted by the expanding arced lines in FIG. 5. As illustrated, the wavefront at 48 passes across and is received by transducer 46a, before it passes across and is received by transducer 46b. The spacing L between transducers 46a and 46b is fixed. Thus the line-of-sight distance x from the utterance origin 42 to transducer 46a is shorter than the line-of-sight distance y, by an amount equal to the additional distance the wavefront propagated to 46b during the calculated delay time dt. In other words, the distances from the utterance origin 42 to the respective transducers 46a and 46b can be related knowing the calculated or measured time delay dt and the speed of sound c within the aircraft cabin, as follows:

$$y = x + dt \times c$$

Having calculated the distances x and y, and knowing the fixed spacing L, as well as the known locations of microphone transducers 46a and 46b, the direction and position of the utterance origin 42 can be determined. If desired, the position of the utterance origin can be expressed using an angular measure. In FIG. 5, such angular measures are shown at $\theta 1$ and $\theta 2$ measured relative to a line orthogonal to the plane in which the transducers 46a and 46b lie. It will be appreciated that FIGS. 4 and 5 are intended simply to show conceptually how the utterance origin is related to the arrival time at plural transducers whose position and spacing are known. There are a variety of computational techniques that may be used to determine direction of arrival, and spatial position or location of the utterance origin. One embodiment of doing so is to program the processor to identify the utterance origin by maximizing the generalized cross correlation phase transform (GCC-PHAT) function, discussed below.

Focused Microphone Mode

Returning to FIG. 3, the processor 56 uses the calculated utterance origin calculation to supply direction of arrival instructions to the microphone array beamforming delay adjustment processor 57. This inserts time delays or phase changes to selected ones of the incoming signals from the analog to digital converters 54, to cause the microphone array to operate as steered beamforming array, which directs or focuses the microphone array pickup pattern to enhance sound pickup in the direction of the utterance origin. The output of the microphone array beamforming delay adjustment processor 57 is fed as an audio input source at 24 and 38. In this way, audio signals picked up by the microphone array 30 will favor sound pickup in the direction in which the beam has been actively focused. As noted above, the focused microphone mode may be utilized concurrently with the steered speaker mode.

Steered Speaker Mode

Returning to FIG. 3, the processor 56 uses the calculated utterance origin calculation to supply instructions to the beam steering circuit or signal processing operation 60. Actual steering of the acoustic beam is performed without the need for physical reorientation of the speaker transducers 50 or microphone array 30. Rather, the beam is steered electrically by introducing timing or phasing differences in the audio signals being fed to each individual transducer. These phase-shifted or time-shifted audio signals are supplied to the individual speaker transducers 50 of speaker array 32 through suitable driver circuits 72 and power amplifiers 74. Note that the phase-shifted or time-shifted audio signals are delivered in parallel to the speaker transducers of the speaker array. Care should be taken that driver circuits 72 and power amplifiers 74 introduce equal phase delay (or time delay), if any, on all channels. This will ensure that the proper constructive and destructive interference will occur in order to steer the beam correctly. This can be accomplished, in part, by careful component selection to match the impedance of the speaker transducers, and to minimize capacitive or inductive differences among channels, and by ensuring that electrical signal path lengths are the same for all channels.

The beam steering circuit or process 60 is essentially delivering the audio content from the avionics communication system 38 (for the pilots) or from the in-flight entertainment system 24 (for the passengers), after inserting a calculated time delay for each channel to effect beam steering. If not already in the digital domain, the audio inputs from the avionics communication system 38 and the in-flight entertainment system 24, may be converted through analog to digital conversion in the audio processing circuit 62.

Modulated Ultrasonic Beam Embodiment

If desired, a more directional (narrower) beam 44 can be achieved using an ultrasonic speaker system, which may be implemented as part of the audio processing circuit 62 as illustrated by the dashed box 64 in FIG. 3. In this embodiment, the audio input from the avionics communication system 38 and/or the in-flight entertainment system 24, after having been processed by the beam steering adjustment 60, is supplied to a modulator circuit 68, which modulates the audio program content onto an ultrasonic carrier supplied by ultrasonic oscillator 66. One such modulator circuit is employed to feed each of the driver 72 circuits, so that each transducer transmits an ultrasonic signal with the appropriate time delay (phase adjustment). In this way, the speaker array produces an ultrasonic beam having an ultrasonic carrier wave at a frequency that is inaudible to the human ear. The system audio is modulated upon this ultrasonic carrier wave and thus travels with the carrier wave in the direction of the beam. As the beam passes through air molecules in route to the listener's ears, the modulated wave becomes naturally demodulated through interaction with the air molecules. Because of this natural demodulation, the listener is able to hear the demodulated audio signal, sounding much as if it had come from a conventional speaker.

Circuit for Controlling Speaker Beam Direction

The signal processor 56 uses the arrival time delay between the microphone transducer signals to electronically steer the beam 44 in the direction of the person whose utterance was received. This is accomplished by inserting a controlled delay.

Figure 6:
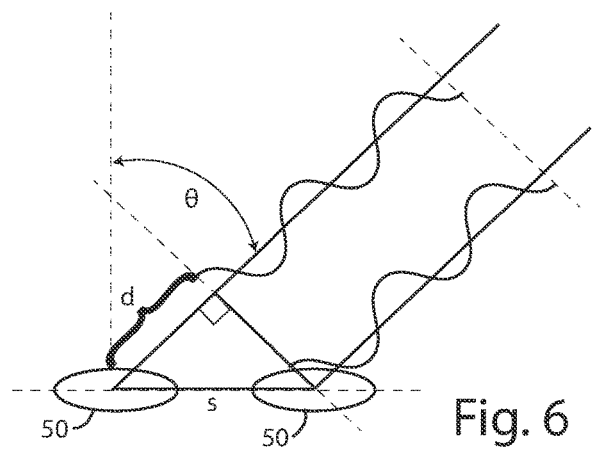
FIG. 6 is a diagram illustrating how the phasing (inserted time delay) of a pair of speaker transducers within the speaker array can affect the beam pointing direction through constructive and destructive interference.

To better understand how beam steering is accomplished, refer to FIG. 6, which illustrates two speaker transducers 50 arranged in a linear array. When both speakers are fed coherently with the same audio signal, the sound waves emanating from each speaker are in phase and the sound will appear to come straight on from the plane of the speakers, i.e., from a direction perpendicular to the horizontal axis (as seen in FIG. 6).

However, when one of the speakers is fed by a signal that is delayed by a time increment dt, constructive and destructive interference between the respective wavefronts of the two speakers will produce the loudest collective sound in an angled direction, no longer perpendicular but at an angle $\theta$ to the horizontal axis, as shown in FIG. 6. The angled direction can be computed trigonometrically, by knowing the wavelength of the audio frequency. Frequency (f) and wavelength $\lambda$ are related the speed of sound c, according to the following equation:

$$f = c/\lambda$$

To steer the beam in the direction (angle $\theta$) illustrated in FIG. 6, the signal from speaker on the left (in FIG. 6) is delayed by a time dt computed to account for the fact that the signal from speaker on the left (in FIG. 6) must traverse the additional distance d, in order for its wavefront to be in phase with the wavefront from the speaker on the right (in FIG. 6). This delay dt can be computed for a given angle $\theta$ using the following trigonometric relationship:

$$dt = s\,\sin(\theta)/c$$

where s is the speaker separation and c is the speed of sound at the ambient temperature.

Programmed Processor Implementation

Figure 7:
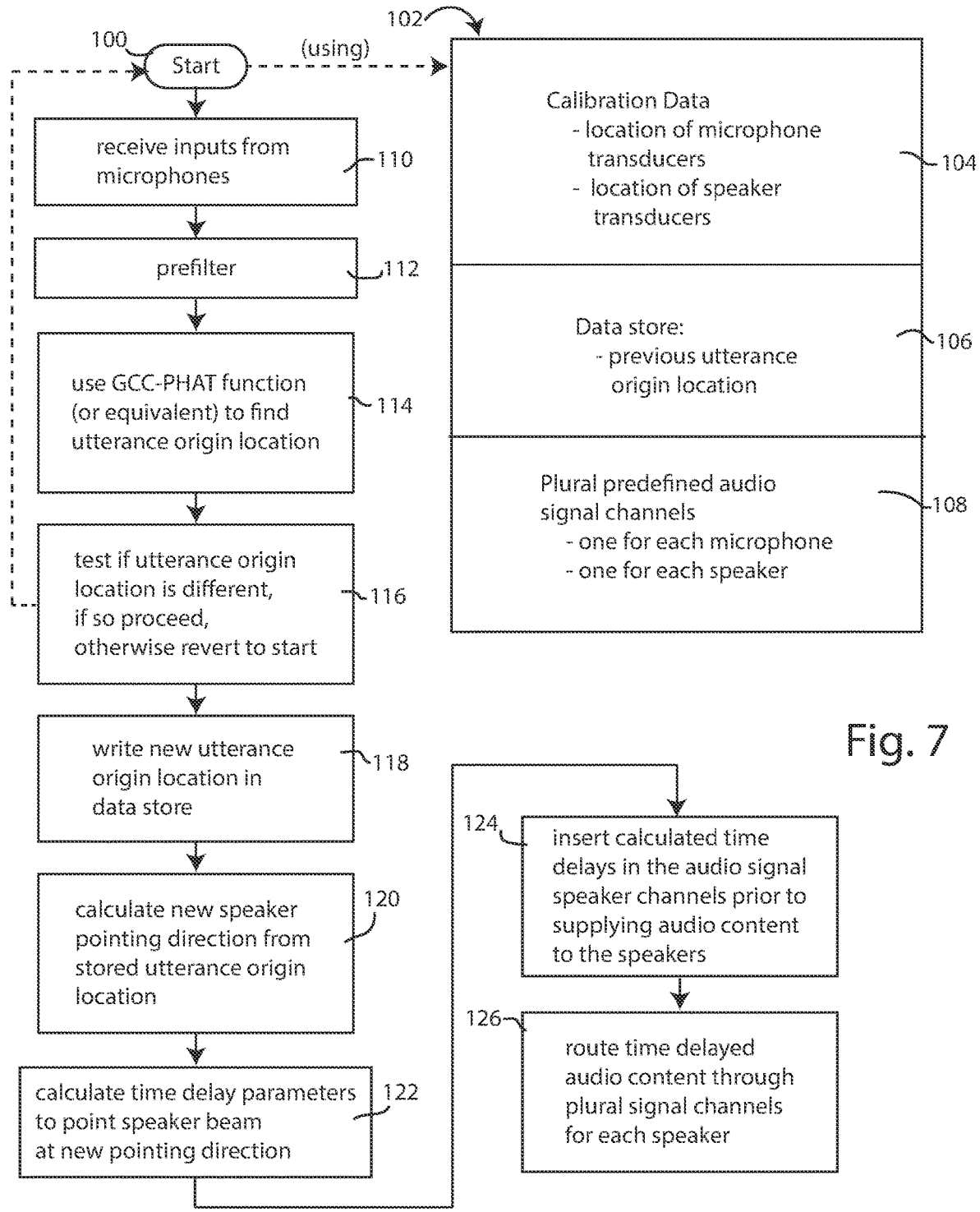
FIG. 7 is a flowchart useful in understanding how a programmed processor may implement the audio directing system.

FIG. 7 illustrates one exemplary embodiment of the steps the processor is programmed to perform, beginning at 100. Although the processor is depicted as a sequential series of steps, the operations may be performed in parallel, if desired.

The processor uses memory 102 configured to store calibration data 104, used to give the processor knowledge of the locations of microphone transducers and speaker transducers. Alternatively, the transducer locations can be hardcoded in the firmware or software, if desired. The memory 102 also provides a data store 106 used to store the last used (previous) utterance origin location. The processor uses this stored location to compute speaker pointing direction, updating the stored value as needed if the speaker moves—effectively implementing a sample and hold function. Memory 102 is also used to define plural predefined audio channels 108, including a set of channels for each microphone transducer and a set of channels for each speaker transducer. These are digital audio channels, storing digital audio from the microphones and from the avionics communication system 38 or in-flight entertainment system 24, in suitably sized buffered memory locations upon which the processor can operate to manipulate the data.

The processor receives inputs from the microphones at 110 and applies a prefilter at 112. As discussed below, the prefilter can be used to inhibit or reject sounds received by the microphones that do not have qualities of human speech. The processor applies a time of arrival algorithm or function upon the prefiltered (human speech utterance) data, at 114, to find the utterance origin location. In one embodiment a GCC-PHAT function is used.

The processor at 116 tests if the utterance origin location is substantially different from the value previously stored in data store 106. If so, the processor proceeds to step 118, writing the new utterance origin location in data store 106. If not, the processor reverts to start 100.

From the utterance origin location value stored in data store 106, the processor, at step 120, calculates a new speaker array pointing direction. See FIG. 5. This new pointing direction is then used by the processor, at 122, to calculate time delay parameters that will cause the speaker beam to point at the new pointing direction. See FIG. 6. The processor uses these calculated time delay parameters, at step 124, to insert time delays in the audio channels for each speaker, as applicable. This is done by operating on the digital audio data buffered in the audio channels, to reposition certain data for delayed playback (relative to other audio channels). The time-delay processed audio data are supplied as audio content through the plural signal channels for each speaker.

Generalized Cross Correlation Phase Transform (GCC-PHAT)

With reference to FIG. 3, in one embodiment processor 56 is programmed to perform time of arrival detection to determine the utterance origin (position and/or direction) by maximizing the generalized cross correlation phase transform (GCC-PHAT) function 58. This compares the signals received from two spatially separated microphone transducers by applying them to a cross correlator having an adjustable time component that establishes a time delay in one signal relative to the other. The two signals are then multiplied together and integrated for a variety of different delay combinations by programmatically or algorithmically adjusting the time component until the maximum peak is discovered. The time component delay at which this maximum peak is achieved corresponds to a maximum likelihood estimation of the arrival time delay between the two signals.

Figure 8:
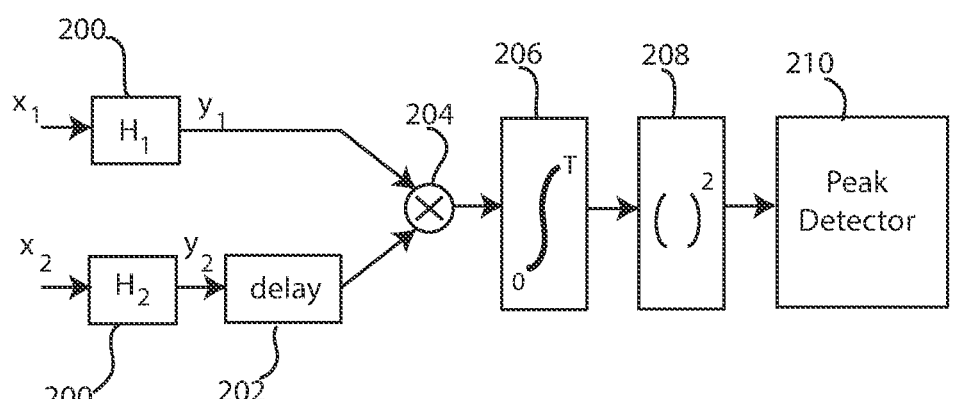
FIG. 8 is a block diagram useful in understanding GCC-PHAT maximum likelihood estimation technique for direction-of-arrival analysis.

FIG. 8 illustrates the basic maximum likelihood estimation principle. The two microphone signals $x_1$ and $x_2$ are applied to filters 200 having filter functions $H_1$ and $H_2$. One of the two signal paths is delayed (as at 202). The signals are then multiplied together at 204, integrated at 206 and squared at 208 to develop a composite signal that is analyzed by peak detector 210. The two microphone signals are processed in this fashion, while adjusting the delay applied at 202 until the maximum peak is discovered at the peak detector. The process implements a maximum likelihood estimator comprising the pair of receiver prefilters followed by a cross correlator. The time argument at which the correlator achieves a maximum is the delay estimate.

Different filter functions or transforms may be used for filters 200. In the described embodiment a Phase Transform (PHAT) has been used. Other filter alternatives may be substituted. If desired the GCC-PHAT function can be implemented using Matlab gccphat(sig, refsig) function.

Prefiltering

The GCC-PHAT function used by the signal processor 56 is fairly robust in the presence of background noise, assuming the background noise is relatively uncorrelated. However, to enhance utterance detection and to avoid false triggers, the signal processor 56 may also include one or more audio prefilters to process the microphone transducer data prior to time of arrival estimation (GCC-PHAT). Such prefiltering may include frequency band filtering, where microphone transducer signals outside the normal human speech frequency range are suppressed. To further improve scalability, different pairs of the microphone array can be used to derive a more reliable estimate of the direction of arrival.

Such prefiltering may also include mel-frequency processing, which approximates the human auditory system's response more closely than the linearly-spaced frequency bands. In addition, prefiltering may also include time-window processing whereby the incoming stream of data from the microphone transducers sampled into time windows that correspond to the natural duration of human phonetics, allowing the processor to suppress time of arrival estimation processing on signals which may comprise the same frequencies as human speech but which do not exist over timeframes comparable to human speech.

In more advanced systems, prefiltering may also include speech recognition processing, whereby the processor tests whether a received signal generates a sufficiently high likelihood score from a speech recognizer algorithm to conclude that the signal is human speech. In this case it is not necessary for the recognizer to decode the utterance into text, but merely to determine that the received sounds bear a high probability of being human speech. Combinations of these and other similar filters may also be used.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. An intercom for an aircraft having a flight deck and cabin which define a plurality of spatially disparate zones, where the plurality of spatially disparate zones includes at least a first zone in the flight deck and at least a second zone in the cabin and a third zone in the cabin, comprising:
 a plurality of microphone arrays, one each of the plurality of microphone arrays being disposed in each of the plurality of spatially disparate zones, and each of the plurality of microphone arrays comprising multiple microphone transducers;
 a plurality of speaker arrays, one each of the plurality of speaker arrays being disposed in each of the plurality of spatially disparate zones, each of the plurality of speaker arrays producing an individually controllable steerable acoustic beam, and each of the plurality of speaker arrays comprising multiple speaker transducers;
 a speech recognizer coupled to each of the plurality of microphone arrays and operable to generate recognition text corresponding to utterances derived from acoustic signals picked up by the plurality of microphone arrays;
 a direction control processor coupled to each of the plurality of microphone arrays and to each of the plurality of speaker arrays; and
 a dialogue manager processor coupled to the speech recognizer and to each of the plurality of microphone arrays and plurality of speaker arrays;
 the dialogue manager processor being programmed to respond to at least one keyword in a set of predefined keywords to selectively open a communication channel between a microphone array and a speaker array in the first zone and a microphone array and a speaker array in the second zone to establish two-way communication between the first zone and the second zone, and wherein the dialogue manager processor is further programmed to respond another at least one keyword of the set of predefined keywords to selectively open a communication channel between the microphone array and the speaker array in the first zone and a microphone array and a speaker array in the third zone to establish two-way communication between the first zone and the third zone; wherein:
 the direction control processor is programmed to analyze arrival time of signals from the microphone arrays in the second zone to identify locations of speaking users in the second zone, and to analyze arrival times of signals from the microphone arrays in the third zone to identify locations of speaking users in the third zone;
 the directional control processor is programmed to steer an acoustic beam from the speaker array in the second zone toward the identified locations of the speaking users in the second zone, and to steer an acoustic beam from the speaker array in the third zone toward the identified locations of the speaking users in the third zone.

2. The intercom of claim 1 wherein the set of predefined keywords includes:
a keyword to accept opening of the communication channel between the first zone to the second zone and wherein the dialogue manager processor is further programmed to apply privacy rules that inhibit routing of the voiced communication from the second zone to the first zone until a subsequent keyword in the set of predefined keywords is uttered from the second zone to accept opening of the communication channel.

3. The intercom of claim 1 wherein the dialogue manager processor is programmed to apply rules that inhibit routing of the voiced communication to an occupant sleeping zone.

4. The intercom of claim 3 wherein the dialogue manager processor is coupled to a computer system onboard the aircraft that stores a record of a current route of flight and determines an aircraft state of flight relative to the current route of flight, such that the applied rules inhibiting routing to the occupant sleeping zone take into account the aircraft state of flight.

5. The intercom of claim 4 wherein the dialogue manager processor applies rules governing routing to the occupant sleeping zone based on timing from departure and/or arrival, altitude above a predetermined flight level, predetermined crew alerting system (CAS) messages and pilot over-ride.

6. The intercom of claim 1 wherein the dialogue manager processor is further programmed to respond to another at least one keyword of the set of predefined keywords to open a communication channel between the microphone array and the speaker array in the second zone and the microphone array and the speaker array in the third zone.

7. The intercom of claim 1 wherein the dialogue manager processor is programmed to exert supervisory control over voiced communications between zones only when words selected from the set of predefined keywords are uttered.

8. The intercom of claim 3 wherein the dialogue manager processor is programmed to exert supervisory control over voiced communications between zones only when words selected from the set of predefined keywords are uttered and when the applied rules inhibiting routing to the occupant sleeping zone are satisfied.

9. The intercom of claim 1 further comprising a signal processor that includes a filter to suppress signals produced by sounds sensed by a microphone array that lack a characteristic of a human utterance.

10. The intercom of claim 9 wherein the filter suppresses signals lacking substantial energy at frequencies associated with human speech.

11. The intercom of claim 9 wherein the signal processor preprocesses signals from the microphone arrays to inhibit the effect of sounds not uttered by an aircraft occupant.

12. The intercom of claim 1 further comprising a sample and hold circuit that maintains a pointing direction of a speaker array in the direction of a last sensed utterance until a next sensed utterance is processed.

13. The intercom of claim 1 further comprising a signal processor that tracks an utterance of the speaking user in the second zone in real time and controls a pointing direction of the speaker array in the second zone based on such real time tracking.

14. The intercom of claim 1, wherein the set of predefined of keywords includes a keyword to close a communication channel.

15. The intercom of claim 1, wherein the set of predefined keywords includes a keyword to calibrate a beam direction of the at least one of the plurality of speaker arrays.

16. The intercom of claim 1, wherein handing off from a current microphone array to a new microphone array is initiated in response to detection of a calibration request utterance originated by the speaking user.

17. The intercom of claim 1, wherein handing off from a current speaker array to a new speaker array is initiated in response to detection of a calibration request utterance originated by the speaking user.

18. The intercom of claim 1, wherein:
the direction control processor is further programmed to analyze arrival time of signals from a new microphone array to identify a new location of the speaking user;
the identified new location is within the second zone; and
the direction control processor is further programmed to use the identified new location to control a new beam direction of a new speaker array, such that sound emitted by the new speaker array is steered toward the identified new location.

19. A method of operating an intercom system of an aircraft having a plurality of spatially disparate zones, where the spatially disparate zones include at least a first zone in a flight deck and at least a second zone in a cabin and a third zone in the cabin, the intercom system comprising a plurality of microphone arrays, at least one of the plurality of microphone arrays being disposed in each of the plurality of spatially disparate zones, a plurality of speaker arrays, at least one of the plurality of speaker arrays being disposed in each of the plurality of spatially disparate zones, and at least one processor coupled to the plurality of microphone arrays and coupled to the plurality of speaker arrays, the at least one processor programmed to perform operations comprising:
generating recognition text corresponding to utterances derived from acoustic signals picked up by the plurality of microphone arrays;
responding to at least one keyword in a set of predefined keywords in the generated recognition text by:
selectively opening a communication channel between a microphone array and a speaker array in the first zone and a microphone array and a speaker array in the second zone to establish two-way communication between the first zone and the second zone;
analyzing arrival time of signals from the microphone arrays in the second zone to identify locations of speaking users in the second zone,
steering an acoustic beam from the speaker array in the second zone toward the identified locations of the speaking users in the second zone;
responding to another at least one keyword of the set of predefined keywords in the generated recognition text by:
selectively opening a communication channel between the microphone array and the speaker array in the first zone and a microphone array and a speaker array in the third zone to establish two-way communication between the first zone and the third zone;
analyzing arrival times of signals from the microphone arrays in the third zone to identify locations of speaking users in the third zone;
steering an acoustic beam from the speaker array in the third zone toward the identified locations of the speaking users in the third zone.

20. The method of claim 19, wherein the set of predefined keywords includes:
a keyword to accept opening of the communication channel between the first zone to the second zone and further comprising applying privacy rules that inhibit routing of the voiced communication from the second zone to the first zone until a subsequent keyword in the set of predefined keywords is uttered from the second zone to accept opening of the communication channel; and a keyword to calibrate a beam direction of the at least one of the plurality of speaker arrays.

\* \* \* \* \*